Oct. 18, 1960     F. C. CHOICE     2,956,313

METHODS OF VULCANIZING SOLES ONTO SHOE BOTTOMS

Filed April 28, 1959

*Inventor*
Frank C. Choice
By his Attorney

United States Patent Office

2,956,313
Patented Oct. 18, 1960

2,956,313

METHODS OF VULCANIZING SOLES ONTO SHOE BOTTOMS

Frank Coleman Choice, Leicester, England, assignor to United Shoe Machinery Corporation, Flemington, N.J., a corporation of New Jersey Filed Apr. 28, 1959, Ser. No. 809,432

Claims priority, application Great Britain May 17, 1958

4 Claims. (Cl. 18—59)

This invention relates to methods of molding and vulcanizing soles of rubber or the like onto the bottoms of lasted shoes.

Shoes having rubber soles are made in accordance with two general procedures. In accordance with one of these procedures the sole is molded and vulcanized in one operation and attached to a shoe bottom in another operation. In accordance with the other procedure the rubber sole is molded and vulcanized onto the shoe bottom and attached thereto all in one operation.

For the manufacture of shoes by the second procedure above described various types of machines are available, one of these being disclosed in United States Letters Patent No. 2,922,191, granted January 26, 1960 on an application filed in the name of George C. Barton. This machine is provided with a pair of side mold members, a sole mold member and a shoe form on which a lasted shoe is mounted, the shoe form together with the mold members providing a sole shaped mold cavity. The side mold members are provided with crease plates which project inwardly from the mold members. In the closed position of the side mold members the crease plates engage the upper on the shoe form with sufficient pressure to provide an effective closure of the top of the mold cavity.

Machines of the type disclosed in the Barton application above referred to operate in accordance with two different procedures so far as the closing of the side mold members is concerned. In accordance with one of these procedures the side mold members are fully closed with the shoe form in a retracted position and the shoe form is thereafter advanced to bring the lasted shoe thereon into contact with the crease plates of the side mold members. In accordance with the other procedure the shoe form with a lasted shoe thereon is advanced into mold closing position while the side mold members are open and thereafter the side mold members are closed against the upper at the crease line or feather line of the shoe.

In vulcanizing soles onto shoe bottoms in accordance with the second procedure described in the preceding paragraph a problem has arisen due to the fact that the insole of a lasted shoe on the shoe form, in many cases, is not in intimate contact with the bottom of the shoe form as the shoe form moves downwardly into mold closing position but is spaced therefrom to an appreciable extent. Consequently when the bottom mold member is raised to press the charge in the mold cavity against the insole the end portions of the insole, together with the end portions of the upper lasted thereto, are forced upwardly thus moving the upper slightly with relation to the crease plates. Such movement of the upper relatively to the crease plates frequently leaves undesirable marks on the surface of the upper which are visible in the finished shoe, detracting from its appearance, in some cases to such an extent that the shoe is unmerchantable.

It is an object of the present invention to obviate the objectionable marking of the shoe upper by the crease plates in the operation of the sole vulcanizing machine. With this object in view the present invention, in one aspect thereof, consists in a method of molding outsoles onto shoe bottoms in machines of the type above referred to, which method is characterized by the advancement of the side mold members into an intermediate position in which the end portion of their crease plates are arranged to engage the end portions of a lasted shoe on the shoe form while the shoe form is slightly elevated from its mold closing position. In their intermediate position the side portions of the crease plates are slightly spaced from the side portions of the upper on the foot form. While the side mold members are held stationary in their intermediate position the shoe form is moved downwardly first to bring its sole face into firm and intimate contact with the entire surface of the insole and then to cause the shoe form and the lasted shoe thereon to move downwardly as a unit into their mold closing position. After the shoe form and the lasted shoe thereon have come to rest in their mold closing position the side mold members are advanced from their intermediate position into their fully closed position thereby to bring the crease plates into firm and uninterrupted engagement with the entire periphery of the shoe upper at the crease line thus to complete the closure of the mold cavity. Inasmuch as the insole is now firmly seated against the bottom of the shoe form over its entire area the sole vulcanizing operation may proceed with no likelihood of the occurrence of visible marks on the upper by upward movement of the upper relatively to the crease plates.

The invention will now be described with reference to the accompanying drawings and pointed out in the appended claims.

In the drawings,

Fig. 1 is a vertical section on the plane of the longitudinal median line of the shoe form of a sole vulcanizing machine of the type illustrated, for example, in the United States Letters Patent hereinbefore referred to illustrating, in conjunction with the shoe form, a lasted shoe upper mounted thereon and portions of the side molds together with the crease plates attached thereto at their point of initial engagement with the shoe upper;

Figure 1:
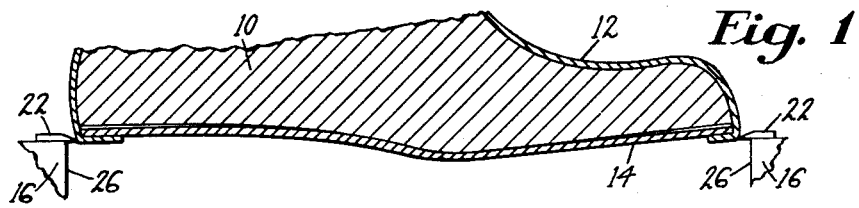

The invention is illustrated in the drawings in its application to a method of molding an outsole of rubber or like moldable material onto the bottom of a lasted shoe mounted on a metal shoe form 10 which serves as the work supporting member of a vulcanizing machine of the type above referred to. The illustrated shoe comprises an upper 12 lasted to an insole 14.

Figure 2:
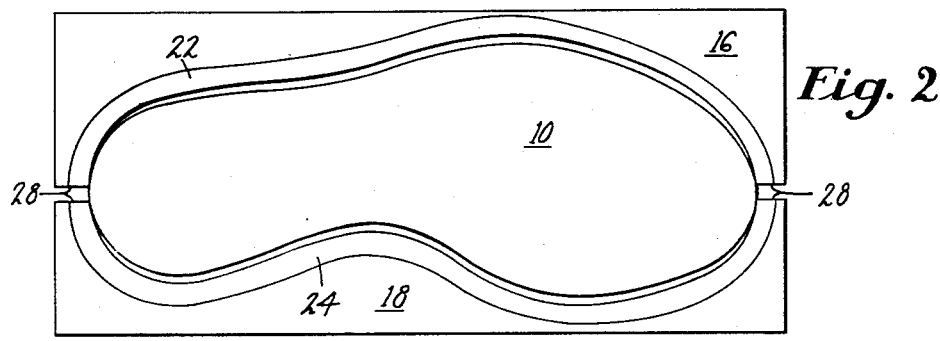
Fig. 2 is a plan view illustrating the side mold members and their crease plates in the partially closed position which they occupy when the crease plates are at their position of initial contact with the shoe upper illustrated in Fig. 1.
Figure 3:
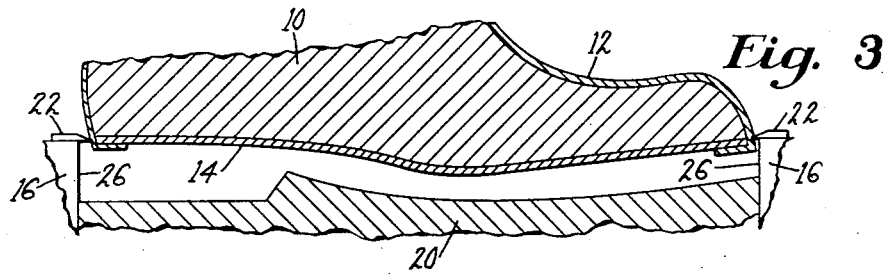
Fig. 3 is a sectional view similar to Fig. 1 showing the side mold members and their crease plates in their position relatively to the shoe heightwise thereof which they occupy during the vulcanizing operation.

The mold organization of the sole molding machine comprises a pair of metal side mold members 16 and 18 (Fig. 2) and a bottom mold member 20 (Fig. 3). Fixed to the upper surfaces of the side mold members are crease plates 22 and 24 which, as shown in Fig. 3, engage the upper 12 at the feather line and penetrate or indent the surface of the upper. The side mold members together form the peripheral wall of the molded sole, each side mold member having an inner wall 26 which has a peripheral contour corresponding to one side portion and approximately one half of the toe portion and one half of the heel portion of a molded sole. The end portions of the side mold members have oppositely disposed plane faces 28 extending heightwise and lengthwise of a shoe in the machine. The upper surface of each side mold member, as seen in side elevation, has a contour corresponding to the heightwise curvature of the feather line of the shoe and it will be understood that the crease plate secured to the side mold member has a corresponding curvature. As seen in Fig. 1 the crease plate extends inwardly beyond the wall 26 of the side mold member thus to overlie and form the extension margin of the molded sole. When the machine is at rest the side mold members 16 and 18 are substantially separated from each other widthwise thereof and the foot form 10 occupies a relatively elevated position facilitating the loading of a lasted shoe thereon.

In practicing the method of the present invention the side mold members are initially partially closed to their relative position illustrated in Fig. 2 in which a gap of approximately one eighth of an inch exists between the oppositely disposed end faces 28. While the side mold members are held fixed in this position the foot form, with the lasted shoe mounted thereon, is moved downwardly into its position illustrated in Fig. 1. In this position only of the upper are engaged by the inner edges of the crease plates 22 and 24. As the foot form 10 moves downwardly from its position in Fig. 1 to its position in Fig. 3 the crease plates 22 and 24 restrain the end portions of the upper against downward movement with the shoe form and cause the shoe form to move downwardly with respect to the end portions of the upper thereby to bring the sole face of the foot form at opposite ends thereof into intimate contact with the insole 14. It will be understood that the foregoing description of the action of the foot form on the upper presupposes a measurable gap between the sole face of the foot form and the end portions of the insole when the foot form, with the shoe thereon, comes into its position illustrated in Fig. 1.

Figure 4:
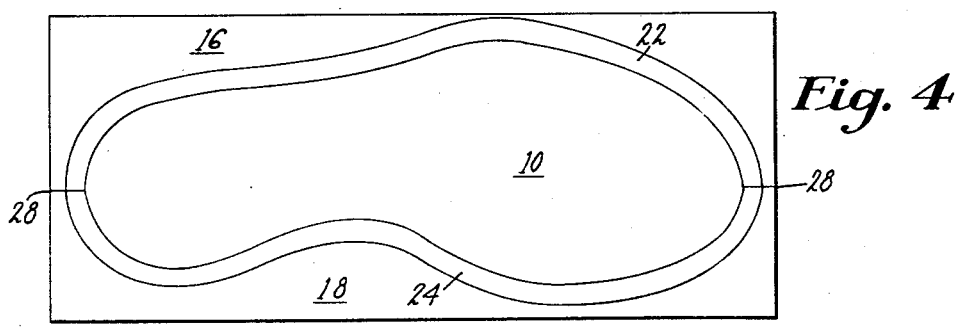
Fig. 4 is a plan view showing the side mold members and their crease plates in their relatively closed position.

In practising the method above described a lasted shoe is mounted on the foot form of a sole vulcanizing machine of the type illustrated, for example in the Barton patent hereinbefore referred to, and a suitable charge of unvulcanized rubber mixture is placed upon the bottom mold member 20. It will be understood that the shoe form is in a loading position remote from its position illustrated in Fig. 1 and the bottom mold member 20 and the side mold members 16 and 18 are in their respective retracted positions in which the bottom mold member has been moved downwardly from its position illustrated in Fig. 3 and the side mold members have been moved laterally away from each other from their position illustrated in Fig. 2. The operator initiates the operation of the machine to cause the side mold members to be advanced into their position illustrated in Fig. 2 which is determined by the engagement of the mold members or their actuating means with a suitable stop member. The shoe form is then advanced to move the shoe downwardly into its position illustrated in Fig. 3. During such downward movement the end portions of the upper at the junction of the overlasting margin engage the crease plates 22, as shown in Fig. 1. Continued movement of the shoe form from its position in Fig. 1 to its position illustrated in Fig. 3 causes the end portions of the form to be firmly seated against the end portions of the insole as hereinbefore described. After the shoe form has come to rest in its position illustrated in Fig. 3 the stop which arrested the advancement of the side mold members 16 and 18 in their relative position illustrated in Fig. 2 is withdrawn to permit the further advancement of the side mold members from their position in Fig. 2 into their fully closed position illustrated in Fig. 4. The final closing action of the side mold members causes the crease plates 22 and 24 to engage the upper and to be indented into the upper at approximately the insole line about the entire periphery of the shoe. After the side mold members are fully closed the vulcanizing operation proceeds in the usual manner to mold and vulcanize an outsole onto the shoe bottom.

While the method of the present invention is herein described as being practised in conjunction with the operation of a sole vulcanizing machine of the type illustrated in the Barton patent hereinbefore referred to, it is to be understood that it is within the scope of the present invention to practise the method herein described in conjunction with the operation of any suitable machine for molding and vulcanizing outsoles onto shoe bottoms.

Having thus described my invention, what I claim as new and desire to secure by Letters Patent of the United States is:

1. That method of making shoes which comprises mounting a lasted shoe on the shoe supporting form of a machine for molding outsoles onto shoe bottoms, placing a suitable charge of an unvulcanized rubber mixture upon the bottom mold member of the machine, advancing a pair of side mold members of the machine into an intermediate position in which their end portions are arranged to be engaged by the end portions of the shoe on the form while their side portions are spaced from each other to an extent greater than the width of the shoe, advancing the form and the lasted shoe thereon first into contact with the partially closed mold members and finally into position to have an outsole molded thereon and then completing the closing of the side mold members to bring them into uninterrupted engagement with the entire periphery of the shoe.

2. That method of making shoes which comprises mounting a lasted shoe on the shoe supporting form of a machine for molding outsoles onto shoe bottoms, placing a suitable charge of an unvulcanized rubber mixture upon the bottom mold member of the machine, advancing a pair of side mold members into a position predetermined by a stop member for arresting the advancement of the members, said predetermined position of the mold members being characterized by the fact that their end portions are arranged to be engaged by the end portions of the shoe on the form while their side portions are spaced from each other to an extent slightly greater than the width of the shoe, operating the machine to advance the form and the lasted shoe thereon first into contact with the partially closed mold members and finally into position to have an outsole molded thereon and then completing the closing of the side mold members to bring them into uninterrupted engagement with the entire periphery of the shoe.

3. That method of making shoes which comprises mounting a lasted shoe on the shoe supporting form of a machine for molding outsoles onto shoe bottoms, placing a suitable charge of an unvulcanized rubber mixture upon the bottom mold member of the machine, advancing the form and the lasted shoe thereon into contact with the crease plates of a pair of side mold members arranged to engage the end portions only of the upper thereby to restrain heightwise movement thereof, continuing the advancement of the shoe form thereby moving it heightwise thereof relatively to the lasted shoe thereon in order to bring the sole faces of the end portions of the form into firm and intimate contact with the insole of the lasted shoe, further continuing the advancement of the shoe form to position the shoe for the reception of an outsole to be molded thereon, and advancing the side mold members to bring their crease plates into uninterrupted engagement with the entire periphery of the shoe thus to complete the closure of the mold cavity.

4. That method of making shoes which comprises mounting a lasted shoe on the shoe supporting form of a machine for molding outsoles onto shoe bottoms, placing a suitable charge of an unvulcanized rubber mixture upon the bottom mold member of the machine, advancing the side mold members of the machine into a position in which they are spaced from the opposite sides of the bottom mold member but substantially contiguous to the toe and heel portions of said bottom mold member, advancing the form and lasted shoe thereon to bring that portion of the shoe upper at the junction of the body portion of the upper and its lasted margin into engagement with the crease plates of the side mold members at the toe and heel portions only of the shoe, continuing the advancement of the shoe form thereby moving the toe and heel portions of the form relatively to the shoe while the toe and heel portions of the shoe are restrained against heightwise movement by the crease plates thus bringing the sole faces of the end portions of the form into firm and intimate contact with the insole of the lasted shoe, advancing the shoe form and the lasted shoe thereon as a unit by a continuation of the advancement of the shoe form by an increment not exceeding the combined thicknesses of the insole and the overlasting margin thereby to position the shoe for the reception of an outsole to be molded thereon, completing the advancement of the side mold members to bring their crease plates into uninterrupted engagement with the entire periphery of the shoe thus to complete the closure of the mold cavity and applying heat and pressure to the charge on the bottom mold member thereby to mold an outsole onto the shoe bottom.

References Cited in the file of this patent

UNITED STATES PATENTS

| | | |
|---|---|---|
| 2,743,483 | Parini | May 1, 1956 |
| 2,878,523 | Hardy | Mar. 24, 1959 |